United States Patent [19]
Kang

[11] Patent Number: 6,094,475
[45] Date of Patent: Jul. 25, 2000

[54] APPARATUS AND METHOD FOR CONTROLLING AUTOMATIC ANSWERING SERVICE OF PORTABLE TELEPHONE IN A BASE STATION UNIT

[75] Inventor: Yoon-Sop Kang, Busankwangyeok, Rep. of Korea

[73] Assignee: Samsung Electronics Co., Ltd., Rep. of Korea

[21] Appl. No.: 08/996,384

[22] Filed: Dec. 22, 1997

[30] Foreign Application Priority Data

Dec. 21, 1996 [KR] Rep. of Korea ........................ 96-69638

[51] Int. Cl.⁷ ........................................................ H04M 1/64
[52] U.S. Cl. .................................. 379/84; 375/70; 455/412
[58] Field of Search ............................... 379/67.1, 70, 72, 379/77, 88.19, 88.2, 88.21, 88.25, 88.28; 455/412, 413

[56] References Cited

U.S. PATENT DOCUMENTS

| | | | |
|---|---|---|---|
| 4,941,203 | 7/1990 | Patsiokas et al. | 379/77 |
| 5,511,111 | 4/1996 | Serbetcioglu et al. | 379/88.21 |
| 5,528,666 | 6/1996 | Weigand et al. . | |
| 5,572,576 | 11/1996 | Klausner et al. | 379/88.21 |
| 5,586,172 | 12/1996 | Sakurai et al. | 379/70 |
| 5,907,596 | 5/1999 | Karnowski | 379/88.21 |

FOREIGN PATENT DOCUMENTS

| | | |
|---|---|---|
| 2309138 | 7/1997 | United Kingdom . |
| WO9003068 | 3/1990 | WIPO . |

OTHER PUBLICATIONS

European Search Report for Application No. GB 9726784.3, Jun. 1998.
WPI Abstract Accession No. 91–025702/199104 and JP 020295297A (NEC) Dec. 6, 1990.

*Primary Examiner*—Paul Loomis
*Attorney, Agent, or Firm*—Dilworth & Barrese

[57] ABSTRACT

An apparatus and method for controlling an automatic answering service in a base station unit even when the portable telephone is in a non-serviceable state. The apparatus includes a voice announcement message recorder/playback circuit for recording and playing back a voice announcement message that informs the caller that the portable telephone is in a non-serviceable state and requests the caller to leave a message. A caller message recorder/playback circuit records and plays back the caller's message. A controller checks the operation state of the portable telephone upon sensing an incoming call, causes the voice announcement message recorder/playback circuit to playback the voice announcement message to the caller when the portable telephone is in a non-serviceable state, and subsequently causes the caller message recorder/playback circuit to playback the caller's message to the portable telephone when the portable telephone is in a serviceable state.

5 Claims, 3 Drawing Sheets

APPARATUS AND METHOD FOR CONTROLLING AUTOMATIC ANSWERING SERVICE OF PORTABLE TELEPHONE IN A BASE STATION UNIT

BACKGROUND OF THE INVENTION

1. Field of the Invention

The present invention relates to answering services in a telephone communication system and, more specifically, to an apparatus and method for providing automatic answering services to a portable telephone unit from a base station unit.

2. Description of the Related Art

In an automatic answering service provided to a portable telephone user, a caller's messages are recorded when the user selects an automatic answering service function and the portable telephone is in a serviceable state. Furthermore, a call may be connected, according to a selection by the user, while the automatic answering service is being provided. This automatic answering service is possible when the call connection is completed. Generally, the automatic answering service is used to receive and record a caller's information when the user does not answer the call. Similarly, upon telephoning the portable telephone with a radio paging receiver, if the portable telephone is in an off-the-hook state, the caller can call the user by an automatic radio paging service or provide a voice message using a voice mail box. If the portable telephone user has a wire telephone, a service for transmitting or transferring the call to that telephone can be provided. However, these services, which are provided by request to the subscriber, are only possible when the portable telephone user has other communication equipment, such as, for example, the radio paging receiver or the wire telephone. In the automatic answering service for the wire telephone, an additional unit is installed to that telephone so that if the telephone is not answered within a predetermined time, a caller's message is recorded. Meanwhile, if the portable telephone is in a non-serviceable area or its power source is turned off, the automatic answering service will not be provided. As a result, the caller may unsuccessfully attempt the call connection several times.

It is to be appreciated that when the caller calls the portable telephone user, if the call is not connected with the portable telephone, the automatic answering service is not provided to the caller. To support the automatic answering service even in such a circumstance, other communication equipment, for example, the radio paging receiver or the wire telephone, is required. However, the automatic answering service received through the wire telephone may result in a restriction on the mobility of the portable telephone user. Thus, since the automatic answering service for the portable telephone is carried out by the called terminal itself (i.e., the portable telephone), a communication channel must be formed with the portable telephone.

SUMMARY OF THE INVENTION

It is therefore an object of the present invention to provide an apparatus and a method which can support an automatic answering service from a base station unit even if a portable telephone is in a non-serviceable state.

In accordance with an embodiment of the present invention, an apparatus for controlling an automatic answering service of a portable telephone in a base station unit is provided. The apparatus includes: a voice announcement message recorder/playback circuit for recording and playing back a voice announcement message that informs a caller that the portable telephone is in a non-serviceable state and requests the caller to leave a message; a caller message recorder/playback circuit for recording and playing back the caller's message; and a controller for checking the operation state of the portable telephone upon sensing a call, for causing the voice announcement message recorder/playback circuit to playback the voice announcement message to the caller when the portable telephone is in the non-serviceable state, and for causing the caller message recorder/playback circuit to playback the caller's message to the portable telephone when the portable telephone is in a serviceable state.

In accordance with another embodiment of the present invention, a method for controlling an automatic answering service of a portable telephone in a base station unit is provided. The method includes the steps of: checking whether a call is generated; checking the current operation state of the portable telephone when the call is generated; transmitting a voice announcement message to the caller when the portable telephone is in a non-serviceable state; forming a message header and recording a message from the caller; checking whether the portable telephone is in a serviceable state; and transmitting the recorded caller's message to the portable telephone when the portable telephone is in the serviceable state.

These and other objects, features and advantages of the present invention will become apparent from the following detailed description of illustrative embodiments thereof, which is to be read in connection with the accompanying drawings, in which like reference symbols indicate the same or similar components.

DETAILED DESCRIPTION OF PREFERRED EMBODIMENTS

An embodiment of the present invention will be described in detail hereinbelow with reference to the accompanying drawings. In the following description, numerous specific details are set forth to provide a more thorough understanding of the invention. However, it will be apparent to one skilled in the art that the invention may be practiced without these specific details. In other instances, well-known functions or constructions which may obscure the invention in unnecessary detail are not described in detail.

Figure 1:
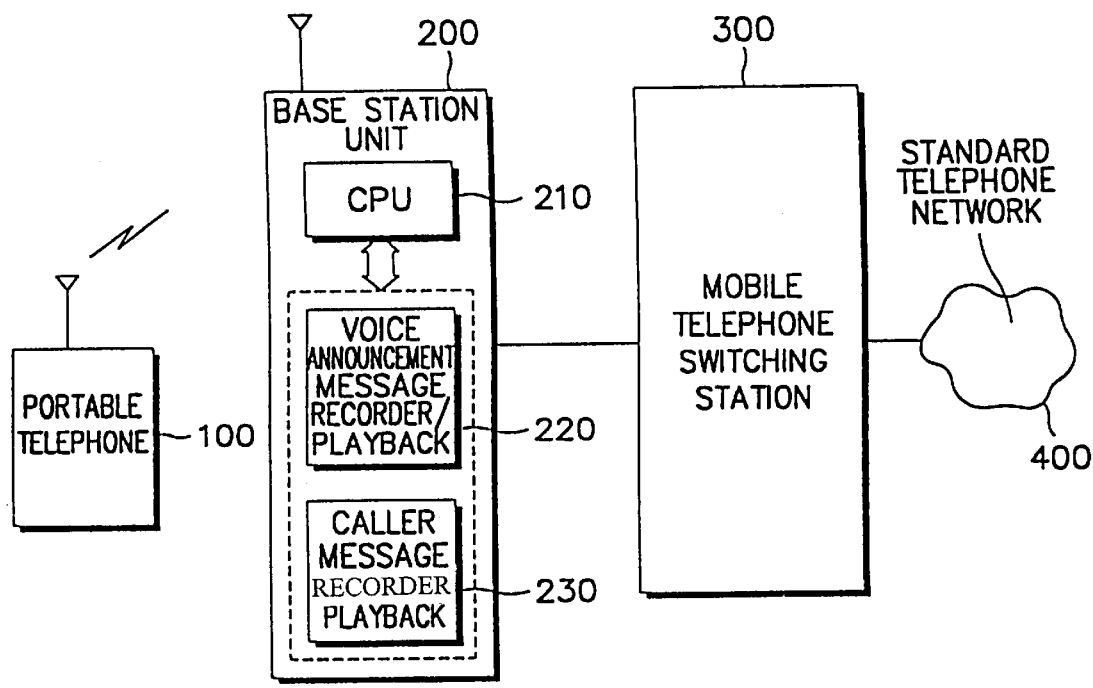
FIG. 1 is a block diagram of an automatic answering system for a portable telephone according to an embodiment of the present invention.

Referring to FIG. 1, it is assumed that a portable telephone 100 is in a non-serviceable state. A base station unit 200 includes a central processing unit (CPU) 210, a voice announcement message recorder/playback circuit 220, and a caller message recorder/playback circuit 230, in addition to constructions known in the art. The voice announcement message recorder/playback circuit 220 records and plays back pre-recorded voice announcement messages informing a caller that portable telephone 100 is in a non-serviceable state and requesting the caller to leave a message. The caller message recorder/playback circuit 230 records and plays back the caller's voice message. The base station unit 200 is connected to a standard telephone network 400 via a mobile telephone switching station 300.

Figure 2:
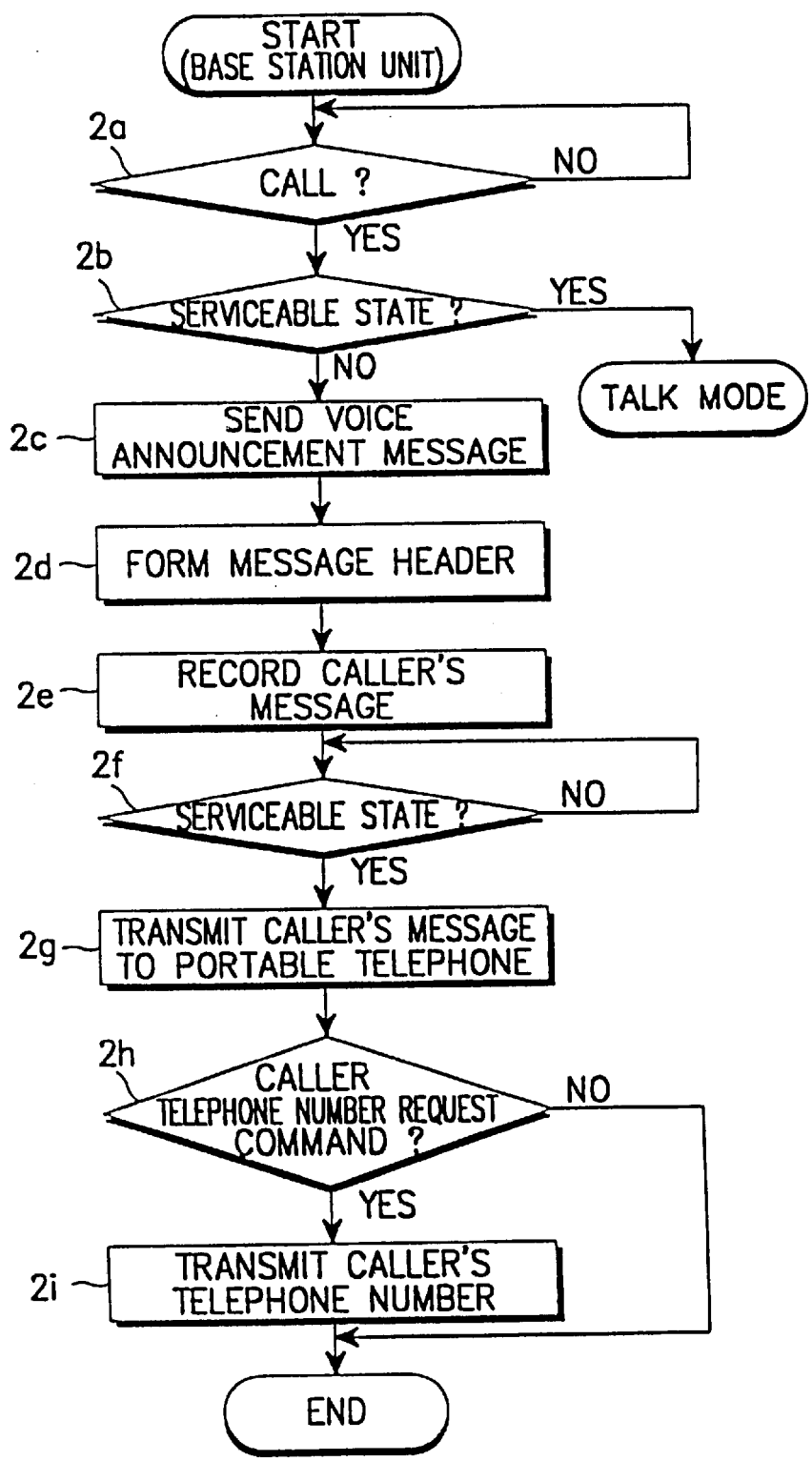
FIG. 2 is a flow chart showing the automatic answering service method for a portable telephone according to an embodiment of the present invention.

FIG. 2 illustrates the automatic answering service method according to an embodiment of the present invention. Referring to FIGS. 1 and 2, CPU 210 of base station unit 200 determines if a call to portable telephone 100 is generated from mobile telephone switching station 300, at step 2a. If a call has not been generated, CPU 210 returns to step 2a and continues to monitor the presence of a call. If a call has been sensed, CPU 210 checks whether or not portable telephone 100 is in a serviceable state (step 2b).

If portable telephone 100 is in a serviceable state, a talk mode is set in order to connect the call between the caller and portable telephone 100. However, if portable telephone 100 is not in a serviceable state, CPU 210 controls voice announcement message recorder/playback circuit 220 to send the pre-recorded voice announcement message to the caller, at step 2c. The voice announcement message informs the caller that portable telephone 100 is in a non-serviceable state and requests the caller to leave a message. Next, a message header is formed, at step 2d. Then, the caller's message received through mobile telephone switching station 300 is recorded (step 2e).

Subsequently, CPU 210 again checks whether or not portable telephone 100 is in a serviceable state, at step 2f. If portable telephone 100 is not in a serviceable state, CPU 210 returns to step 2f and continues to monitor the serviceable state of portable telephone 100. When portable telephone 100 is in a serviceable state, the recorded caller's message is transmitted to portable telephone 100, at step 2g.

Next, it is checked whether or not a caller telephone number request command is received, at step 2h. This command is accomplished by pressing a specific digit or a specific function key on the portable telephone 100. If the caller telephone number request command has been received, the caller's telephone number from the message header is transmitted to portable telephone 100, at step 2i.

Figure 3:
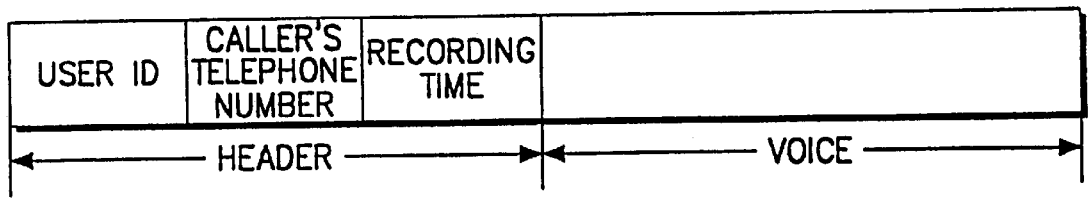
FIG. 3 is a schematic representation of the form of a caller's message according to an embodiment of the invention.

FIG. 3 illustrates a form of the caller's message according to an embodiment of the present invention. The message is broadly divided into a header and a body. The header consists of a user identification (ID), a caller's telephone number and a recording time. The body includes the voice data, i.e., the caller's message.

Thus, as mentioned above, if the call is not connected with the portable phone, the caller's message is recorded, and if the portable telephone is in a serviceable state, the recorded message is transmitted to the portable telephone. If desired, the caller's telephone number is also transmitted. Therefore, the portable telephone user has the advantage of confirming the caller's message while the portable telephone is not answered.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus for controlling an automatic answering service of a portable telephone in a base station unit, comprising:

a voice announcement message recorder/playback circuit for recording a voice announcement message that informs a caller that the portable telephone is in a non-serviceable state and requests the caller to leave a message, said message comprising a header having a user identification and a body;

a caller message recorder/playback circuit for recording the caller's message; and a controller operatively connected to said voice announcement message recorder/playback circuit and said caller message recorder/playback circuit, for checking an operation state of the portable telephone upon sensing a call, said controller activating said voice announcement message recorder/playback circuit to playback the voice announcement message to the caller when the portable telephone is in the non-serviceable state, and activating said caller message recorder/playback circuit to playback the caller's message to the portable telephone when the portable telephone is in a serviceable state.

2. The apparatus of claim 1, wherein said header of said caller's message further comprises a caller's telephone number and a recording time, and said body having actual voice data.

3. A method for controlling an automatic answering service of a portable telephone in a base station unit, comprising the steps of:

checking whether a call is generated;

checking a current operation state of the portable telephone when the call is generated;

transmitting a voice announcement message to a caller when the portable telephone is in a non-serviceable state;

forming a message header and recording a message from the caller;

checking whether the portable telephone is in a serviceable state; and transmitting the recorded caller's message to the portable telephone when the portable telephone is in the serviceable state.

4. The method of claim 3, further comprising the step of transmitting a caller's telephone number to the portable telephone when a caller telephone number request command is received from the portable telephone.

5. A method for controlling an automatic answering service of a portable telephone in a base station unit, comprising the steps of:

(a) checking if a call to the portable telephone is generated;

(b) checking whether the portable telephone is in a serviceable state when the call has been generated;

(c) setting a talk mode to connect the call between a caller and the portable telephone when the portable telephone is in the serviceable state;

(d) sending a pre-recorded voice announcement message to the caller informing the caller that the portable telephone is in a non-serviceable state and requesting the caller to leave a message when the portable telephone is not in the serviceable state;

(e) forming a message header;

(f) recording the message from the caller;

(g) checking whether the portable telephone is in the serviceable state;

(h) transmitting the recorded caller's message to the portable telephone when the portable telephone is in the serviceable state;

(i) checking whether a caller telephone number request command is received; and (j) transmitting a telephone number of the caller from the message header to the portable telephone when the caller telephone number request command has been received.

* * * * *